3,092,487
PROCESS FOR THE MANUFACTURE OF
FERTILIZERS AND THE LIKE
Jacob I. Nevo-Hacohen, Allston, Mass., assignor of one-third to Robert H. Rines, Boston, Mass.
Filed Apr. 28, 1960, Ser. No. 25,384
7 Claims. (Cl. 71—37)

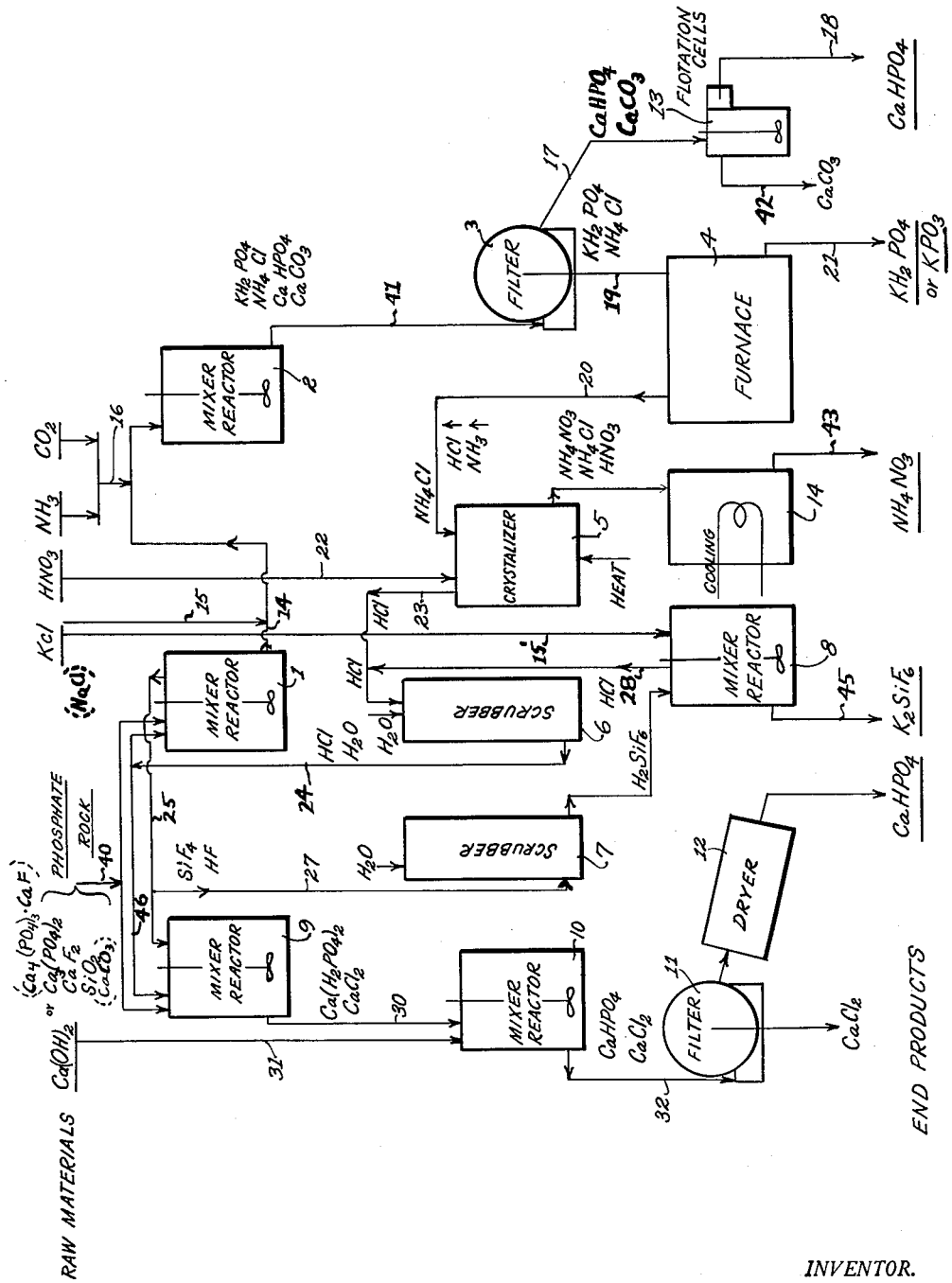

The present invention relates primarily to the manufacture of compositions that assist plant growth, and, more particularly, to processes for the manufacture of fertilizers containing nitrogen, potassium or the like, and phosphate compounds, and various useful by-products.

Numerous processes for the manufacture of fertilizers have been evolved and employed throughout the years. As an illustration, phosphate rock has been treated with sulphuric acid to produce calcium mono-phosphate, either in a single stage, or in a multi-stage process involving the production of concentrated phosphoric acid and the utilization thereof to treat further amounts of the rock, ultimately to produce the calcium mono-phosphate (then known as "triple super-phosphate," in view of the increased yield). Unfortunately, in the said single-stage process, a large amount of calcium sulphate is combined with the super-phosphate, and, though useless to the fertilizing properties of the mixture, and decidedly disadvantageous as weight and bulk surplusage, the calcium compound inherently must be present in the end-product fertilizer. In the multi-stage process, also, the useless and disadvantageous calcium sulphate precipitates out and proves difficult to remove in view of the large quantities inherently produced. Many suggestions have been offered, accordingly, for trying to find some useful purpose for the inherently present calcium sulphate; such as, for example, treating it with ammonia and carbon dioxide to produce an ammonium sulphate salt which can be beneficially used in the fertilizer. Even so, a large quantity of calcium carbonate then deposits out, which again represents useless contaminant and undesired bulk and weight.

Other processes that have been evolved to try to solve the problem of unnecessary and undesired by-products in the fertilizer have involved treating the phosphate rock in a high-temperature blast or electric furnace in the presence of carbon, thereby to produce vaporous phosphorous that may then be formed into phosphoric acid. In this manner, phosphorus is made available from the rock for use in fertilizers, baking powders, cleansers, and for other uses. This dry process, however, is quite expensive to conduct, and, in consequence, it cannot therefore generally be used for the production of commercial fertilizers, except, perhaps, for home use in small gardens and the like, where cost is not a primary factor.

Other proposals advanced by the fertilizer manufacturing industry have involved treating the phosphate rock with nitric acid; but such a process is very rarely used because of the very high cost of nitric acid, as compared with the cost of the before-mentioned sulphuric acid. The nitric-acid-treated rock may be combined with ammonia, as in a slurry, to produce a soluble phosphatic product that may then be treated with carbon dioxide to produce ammonium nitrate, precipitating calcium carbonate. The resulting product, however, not only lacks the potassium required for plant growth and for the strength of the plant, but it involves the inherent and undesirable presence of large quantities of calcium by-product in the fertilizer.

In an effort to try to solve this long-pressing commercial problem, it has also been proposed to treat the phosphate rock with hydro-chloric acid. In addition to the expense involved in furnishing a continuous external supply of hydrochloric acid, as compared with the previously described sulphuric acid, this process results in the production of appreciable quantities of calcium chloride—a poison to many plants if the chlorine content is over two thousand parts per million. The presence of calcium chloride, furthermore, disadvantageously renders the fertilizer very hygroscopic. Again, moreover, the resulting fertilizer product is inherently loaded with useless calcium compound.

Numerous other processes have also been proposed, but they have all been subject to the same kind of difficulties above discussed. Beneficial plant-growth additives, such as potassium chloride or potassium sulphate are employed in order to derive potassium content for the ultimate fertilizer; but in the prior-art commercial processes, the percentage of nitrogen compound, phosphorus compound and potassium compound have generally been limited to the order of 25 to 29% of the total fertilizer product because of the inherent presence of the above-mentioned undesired, though heretofore unavoidable, calcium and other by-products. Thus, for example, in a present-day fertilizer mixture, there may be about 10% nitrogen content, about 6% $P_2O_5$ content, and about 4% $K_2O$, for a total of only about 20% active fertilizer constituent; the remaining 80% of the fertilizer consisting of carrier or soil-conditioning materials, including the unnecessary and undesired, but heretofore unremovable calcium, and, often, the very much undesired chloride. This important commercial problem of unnecessary and undesired weight, expense and bulk, is of prime importance in the shipping and utilization of fertilizers; and yet, until the present invention, it has remained largely without satisfactory solution, as above-explained, despite the many and varied proposals advanced by experts in this field for at least the past generation.

An object of the present invention, accordingly, is to provide a new and improved process for the production or manufacture of fertilizers and the like that shall not be subject to any of the above-mentioned disadvantages; but that, to the contrary, shall provide for extremely large percentages of nitrogen, phosphorous compound and potassium compound in fertilizers, as desired, far in excess of those presently available by the techniques above-described and the other prior-art processes of this industry.

A further object is to provide a new and improved process for producing nitrogen-bearing compounds and/or later-described by-products of more general utility, also.

Other and further objects will be explained hereinafter and will be more particularly pointed out in the appended claims.

The invention will now be described in connection with the accompanying drawing which depicts a flow-sheet illustrating the invention in preferred form. In summary, one of the primary features of the invention resides in the process of manufacturing a fertilizer component and the like that comprises reacting the phosphate rock with hydrochloric acid to produce calcium mono-phosphate and by-products; adding preferably potassium chloride, ammonia and carbon dioxide to the calcium monophosphate product to produce potassium monophosphate, ammonium chloride and calcium carbonate; maintaining the pH during this reaction sufficiently large, preferably between substantially 6 and 7, to insure the maintenance of the phosphate, in large proportion, in the soluble state and the precipitation of the said calcium carbonate; and heat-separating the ammonium chloride in gaseous form to separate out either potassium monophosphate at one predetermined temperature or potassium metaphosphate at a higher temperature. The gaseous ammonium chloride may be reacted with nitric acid and cooled to produce the ammonium nitrate fertilizer component. In the last step, gaseous hydrochloric acid also results which may be scrubbed and fed-back to the phosphate rock to sustain the process cycle.

As a first example, in accordance with the present invention, the following raw materials are employed: the phosphate rock (including, for example, $Ca_3(PO_4)_2$, $CaF_2$ and $SiO_2$); potassium chloride (KCl); nitric acid ($HNO_3$); ammonia ($NH_3$); carbon dioxide ($CO_2$).

The resulting products of this example are potassium mono-phosphate ($KH_2PO_4$) and/or potassium meta-phosphate ($KPO_3$); ammonium nitrate ($NH_4NO_3$); calcium diphosphate ($CaHPO_4$); with the ultimate fertilizer being a combination of the potassium mono-phosphate and/or the potassium meta-phosphate with the ammonium nitrate, or ammonium nitrate that has been ammoniated (also hereinafter described as "ammonium nitrate") for such purposes as making the mixture more alkaline for particular soil conditions.

A typical fertilizer manufactured in accordance with this example of the process of the present invention is formed by a mixture of three parts of, for example, the potassium mono-phosphate and ten parts of the ammonium nitrate. This results, as later described, in the following constituent percentages of the fertilizer, as compared with present-day approximately 10%–6%–4% proportions, before discussed:

|  | Present Invention, percent | A Typical Prior-Art Composition, percent |
| --- | --- | --- |
| Nitrogen | 23.2 | 10.0 |
| $P_2O_5$ | 17.6 | 6.0 |
| $K_2O$ | 11.7 | 4.0 |
| Useful Fertilizer Components | 52.5 | 20.0 |

In the present process, the first step involves reacting on the phosphate rock with hydrochloric acid. Hydrochloric acid is originally supplied in the mixer reactor 1, though, as the process progresses, hydrochloric acid is manufactured as a by-product that is fed-back along later-discussed path 24 to assist in continuing or sustaining the process. Into the mixer 1 is placed the phosphate rock, as indicated by the arrowed path 40, so that a reaction takes place with the hydrochloric acid, producing, principally, calcium mono-phosphate $Ca(H_2PO_4)_2$ and calcium chloride $CaCl_2$ at the output path 14. As gaseous byproducts, HF is removed along path 25, and, when $SiO_2$ is present in the phosphate rock, $SiF_4$, as well; these gases being fed along path 27 to a scrubber 7, later described. The resulting calcium mono-phosphate and calcium chloride (and water) is passed out of the mixer reactor 1 along the path 14 to a second mixer reactor 2. Prior to entry into the mixer 2, these reaction products are supplemented by the addition of potassium chloride KCl, as shown at 15, and ammonia and carbon dioxide, preferably gaseous, as shown at 16. The reaction may be represented by the equation:

(1) $3Ca(H_2PO_4)_2 + 7CaCl_2 + 6KCl + 10H_2O + 20NH_3 + 10CO_2 \rightarrow 6KH_2PO_4 + 10CaCO_3 + 20NH_4Cl$ In actual practice, some $CaHPO_4$ may be formed. At low values of pH, phosphoric acid predominates; and at a pH of about 5, there is substantial ($HPO_4$) and ionic ($H_2PO_4$). It has been found that with a pH in excess of 5, of between substantially 6 and 7, and preferably about 6.5, there will be produced a principal proportion of soluble ($H_2PO_4$)—namely, about 98%—and only about 2% ($HPO_4$) that is almost insoluble. In accordance with an important feature of the present invention, the relative amounts of added $NH_3$ and $CO_2$ at the input 16 are controlled to insure a pH of the above-described value in order to maintain the resulting phosphate in large proportion in the desired soluble state, and to tend to precipitate the undesired $CaCO_3$, though the action of the mixer 2 prevents an actual deposit thereof.

The output of the mixer 2 will thus contain potassium mono-phosphate, calcium carbonate, ammonium chloride, and probably a small quantity of calcium di-phosphate. These products are passed along path 41 to a filter 3. The separated cake calcium carbonate and whatever calcium di-phosphate may be present are then carried along the path 17 to flotation cells 13 in order therein to rescue the small quantity of calcium di-phosphate at 18, with the bulk of the calcium carbonate waste precipitating out at 42. The calcium di-phosphate is a very valuable product, being useful as animal food or for related purposes.

The filtrate at 3 containing the potassium mono-phosphate and the ammonium chloride is then passed along the path 19 to a furnace 4, which may, for example, be of the indirect firing type, as described on page 398 and elsewhere in the text "Selected Process Industries," McGraw-Hill, 1950, by R. N. Schreve. The ammonium chloride, at about 520° C., vaporizes out of the furnace 4 along the line 20, in accordance with the equation:

(2) $6KH_2PO_4 + 20NH_4Cl \xrightarrow{heat} 6KH_2PO_4 + 20NH_4Cl\uparrow$

This is indicated at 20 by the two gases "HCl" and "$NH_3$," since, when ammonium chloride is heated to the vaporized state, it acts as if it is a mixture of these two gases; whereas, when it is cooled down, it assumes the ammonium chloride solution crystal form. The resulting discharge product from the furnace 4 at the output 21 is either potassium mono-phosphate ($KH_2PO_4$) or, at a higher temperature, potassium meta-phosphate ($KPO_3$) which is to be used as a fertilizer component in the fertilizer product of the present invention, and which is entirely void of calcium compounds, chlorides or other disadvantageous and undesired by-products.

The gaseous ammonia and hydrochloric acid, termed gaseous ammonium chloride herein, is transferred into a heated crystallizer chamber 5 into which chamber dilute nitric acid is introduced along the path 22. As a result of the heating, the hydrochloric acid is driven off at 23. Since the liquor here-involved is a mixture of nitric acid and hydrochloric acid, which can attack most materials, the materials of the chamber 5 will have to be selected from those plastic or other materials that are known to resist this acid combination. By cooling in the fractional crystallization chamber 14, ammonium nitrate is produced at 43—another uncontaminated fertilizer component. The ammonium nitrate crystals may also be recovered by centrifuging or other well-known processes, as described, for example, on page 386 of the said Schreve text.

The hydrochloric acid in the path 23 is fed to a scrubber 6, into which water is injected, in accordance with the "carbite" process. Hydrochloric acid is thus produced for cycling or feeding back along path 24 into the original mixer reactor 1, thereby sustaining reaction with the phosphate rock in connection with this process.

Returning, now, to the original mixer reactor 1, it was before stated that hydrofluoric acid (HF) and silicon fluoride ($SiF_4$) by-products may escape as gases along the path 27 to the scrubber 7, where silico-fluoride acid $H_2SiF_6$ may be formed. By combining the silico-fluoride acid with potassium chloride, added along the path 15′, in a further mixer reactor 8, a useful weed-killer or other poison, potassium silico fluoride, $K_2SiF_6$, results at 45 in accordance with the reaction:

(3) $H_2SiF_6 + 2KCl \rightarrow K_2SiF_6 + HCl\uparrow$

The resulting gaseous hydrochloric acid is passed along path 28 to the before-mentioned scrubber 6 for the purpose of producing further hydrochloric acid that is fed back to the original mixer reactor 1, via path 24, to sustain the process.

A further example of the versatility of the process underlying the present invention takes advantage of the fact that a great excess of hydrochloric acid is thus produced. It is accordingly also passed along path 46 to still a further reactor 9 into which more of the original phosphate rock has been deposited. The output 30 of the reactor 9 will contain calcium mono-phosphate and calcium chloride, which, in turn, are passed to an additional mixer reactor 10. Calcium hydroxide $Ca(OH)_2$ is then also added, along path 31, to the reactor 10, and the resulting calcium diphosphate and calcium chloride at the output 32 are filtered at 11 to allow the calcium chloride to pass out into solution and to by-pass through a dryer 12 more of the calcium di-phosphate valuable product, before mentioned.

There is thus available, in accordance with the invention, at the outputs 43 and 21, the nitrogen, phosphorous and potassium required for commercial fertilizer in the abundant percentages above referred to, and completely void of any calcium or other undesirable product, including chloride. The yields obtainable with the present invention are accordingly several fold those obtainable by present-day fertilizer processes, as previously explained. Another illustration of typical nitrogen, $P_2O_5$ and $K_2O$ yields obtainable with three parts $KPO_3$ and ten parts $NH_4NO_3$ is 24.3%–18.5%–12.2%, with a total of 55% active fertilizer constituents. In addition, the very valuable animal food or related product calcium di-phosphate may be readily produced as a by-product, as may be the plant killer or other poison potassium silico-fluoride.

As another example, the fundamental process flow of the present invention may also be used for other purposes, such as, for example, the manufacture of sodium mono-phosphate. If sodium chloride is added, instead of potassium chloride, along the flow path 14 between reactors 1 and 2, sodium mono-phosphate may be produced at the output 21; and again, void of any calcium or chloride therein. Such a compound is used widely in baking powders, cleansers and detergents and the like.

In still an additional example, the same type of process flow can be used for manufacturing ammonium monophosphate by adding at the output 14 of the reactor 1 only ammonia and carbon dioxide. The ammonium mono-phosphate is an extremely useful by-product, serving as an ingredient of wood and fabric fire-proofing agents, and as a source of plant food in fertilizers.

The same process flow may, as still a further example, be employed for the manufacture of sodium silico-fluoride or magnesium silico-fluoride, as when sodium chloride or magnesium chloride, respectively, is added instead of potassium chloride along the path 15' into the mixer reactor 8. The sodium silico-fluoride and magnesium silico-fluoride are useful additives for concrete and other materials for such purposes as rendering them impervious to water.

In summary, therefore, in accordance with a basic feature of the invention in the manufacture of fertilizer and the like, the principal advantages reside in the elimination, when desired, of chlorine with its harmful influence on plants; the elimination of the use of sulphuric acid with resulting calcium sulphate in the fertilizer; the elimination of all calcium compounds in the fertilizer product; the obtaining of vastly increased ratios of nitrogen, potassium and phosphorous in the fertilizer; and, in view of the highly useful by-products obtainable with the aid of the present invention, reduction in cost of manufacture. The invention, moreover, enables the use of low concentration phosphate rocks.

Other and further modifications will obviously occur to those skilled in the art, and all such are considered to fall within the spirit and scope of the invention as defined in the appended claims.

What is claimed is:

1. The process of producing a phosphate fertilizer having active fertilizer constituents of the order of fifty percent and higher and substantially devoid of calcium, comprising reacting phosphate rock with inorganic mineral acid to produce a product containing a substantial amount of calcium monophosphate, reacting a combination of ammonia and carbon dioxide with said calcium monophosphate product while controlling the proportions of said ammonia and said carbon dioxide to maintain the pH of the reacting mass between substantially 5 and 7, thereby producing a solution containing the principal portion of said phosphate as phosphate ions maintained in the water soluble state and precipitating the calcium as a carbonate, filtering out said calcium carbonate precipitate, and recovering the filtrate containing said phosphate ions in water soluble state and substantially devoid of calcium.

2. The process of claim 1, wherein said acid is hydrochloric acid.

3. The process of claim 2, wherein said solution and said filtrate contain a substantial amount of ammonium chloride produced from said reacting mass, and further comprising separating said ammonium chloride from said filtrate.

4. The process of claim 3, wherein a salt selected from the group consisting of alkali-metal chlorides and alkaline-earth chlorides is added to the said solution in advance of the said separating of the ammonium chloride.

5. The process of claim 3, wherein said ammonium chloride is separated in gaseous form by the application of heat to said filtrate, and wherein said gaseous ammonium chloride is reacted with nitric acid to produce a solution containing a substantial amount of ammonium nitrate and gaseous hydrochloric acid, and further comprising scrubbing said gaseous hydrochloric acid and feeding the same back to said phosphate rock to acidulate said phosphate rock.

6. The process of claim 5, wherein said solution containing said ammonium nitrate is cooled to crystallize and separate out said ammonium nitrate.

7. The process of claim 1, wherein said product contains a substantial amount of gaseous silicon fluoride, and further comprising scrubbing said gaseous silicon fluoride to produce silico-fluoride acid, and reacting said silico-fluoride acid with a chloride salt to produce a silico-fluoride salt.

References Cited in the file of this patent

UNITED STATES PATENTS

| | | |
|---|---|---|
| 1,235,025 | Glaeser | July 31, 1917 |
| 1,451,399 | Low | Apr. 10, 1923 |
| 1,854,291 | Burdick | Apr. 19, 1932 |
| 2,061,639 | Seyfried | Nov. 24, 1936 |
| 2,134,013 | Turrentine | Oct. 25, 1938 |
| 2,143,438 | Fox | Jan. 10, 1939 |
| 2,164,627 | Seyfried | July 4, 1939 |
| 2,211,918 | Turrentine | Aug. 20, 1940 |
| 2,436,432 | Hunter | Feb. 24, 1948 |
| 2,899,293 | Munekata | Aug. 11, 1959 |